United States Patent [19]

Slater

[11] 3,859,101

[45] Jan. 7, 1975

[54] ZINC-SILICATE ESTER PRIMER COATINGS

[75] Inventor: William Wallace Slater, Louisville, Ky.

[73] Assignee: Celanese Coatings & Specialties Company, New York, N.Y.

[22] Filed: Jan. 23, 1974

[21] Appl. No.: 436,005

[52] U.S. Cl. .................................. 106/1, 106/14
[51] Int. Cl. .............................................. C09d 5/10
[58] Field of Search .................................. 106/1, 14

[56] References Cited
UNITED STATES PATENTS 3,653,930   4/1972   Law et al. ............................. 106/1
3,656,975   4/1972   Phelps et al. .......................... 106/1

Primary Examiner—Lewis T. Jacobs
Attorney, Agent, or Firm—Herbert P. Price; K. A. Genoni; T. J. Morgan

[57] ABSTRACT

One package sacrificial zinc-ethyl silicate coating compositions, useful in preparing protective coatings for ferrous metals, and particularly useful as weldable preconstruction primers, are prepared from zinc dust pigments and an intimate mixture of ethyl silicate, monoethanolamine and zinc chromate.

9 Claims, No Drawings

ZINC-SILICATE ESTER PRIMER COATINGS

BACKGROUND OF THE INVENTION

The field of art to which this invention pertains is corrosion resistant coatings, particularly coating compositions containing sacrificial zinc metal and ethyl silicate.

Sacrificial zinc metal containing ethyl silicate coatings are well known compositions which have found widespread usage in the protection of ferrous surfaces from corrosion. Such coating compositions have been described in an article by J. Loomans and K. Van Lerberghe in La Chimie des Peintieres, Vol. 12, Number 6, 1949, pages 184–190.

Coatings based on ethyl silicate have also been described in the patent literature. British Pat. No. 575,752 describes the curing of silicate esters using piperidine or morpholine to accelerate the cure. U.S. Pat. No. 2,660,538 shows similar systems wherein cyclohexylamine, dicyclohexylamine and ethanolamine are used to catalyze the curing reaction.

In British Pat. No. 652,136 sacrificial zinc coating compositions are described wherein zinc dust is dispersed in a vehicle made from ethyl silicate and monoethanol amine.

U.S. Pat. No. 3,392,036 describes coating compositions made from vehicles composed of ethyl silicate esters and alkyl borates. Such vehicles are said to be useful binders for pigments which include zinc dust and zinc chromate. Welding primers are described in U.S. Pat. No. 3,469,071.

Coating compositions which have a 24 hour pot life are made from zinc dust, ethyl silicates and a long chain acid salt of monoethanolamine as described in U.S. Pat. No. 3,634,109. One package zinc-alkyl silicate coatings, as described in U.S. Pat. No. 3,653,930, are made using alkyl or aryl nitro compounds to prevent gassing. In U.S. Pat. No. 3,660,119, zinc-silicate ester coatings catalyzed with a metal alkoxide dry to touch in 15 minutes under typical summer atmospheric conditions.

SUMMARY OF THE INVENTION

This invention relates to corrosion resistant coating compositions and, in particular, to zinc filled ethyl silicate vehicles which when applied to steel on other ferrous surfaces will provide cathodic or galvanic protection for the ferrous surface.

By this invention one package cathodic corrosion resistant coating compositions are made from zinc in admixture with ethyl silicate, zinc chromate and monoethanolamine. Such compositions are indefinitely stable when stored in the absence of moisture. During storage these compositions exhibit no or very little viscosity increase, no hard settling occurs in the containers and no gassing takes place. When these compositions are applied as coatings to a metal substrate, the coatings dry to touch within 3–5 minutes and are well cured after 24 hours under ambient conditions. such coatings exhibit excellent corrosion resistance even when applied at only one half mil thickness. When used as preconstruction steel primers, the coatings, even at low film thickness, protect the steel from corrosion and when the steel is welded, the coatings do not interfere with the weldability of the system.

DESCRIPTION OF THE INVENTION

Ethyl silicate useful in this invention exists in three forms: tetraethyl ortho silicate, condensed ethyl silicate and ethyl silicate 40. These three commercial forms of ethyl silicate are made by reacting silicon tetrachloride with ethanol, the chemical constitution of the product being dependent upon the amount of water present when the reaction takes place and the work-up of the product. Theoretically, if 4 mols of absolute ethanol are reacted with one mol of silicon tetrachloride, the product is tetraethyl ortho silicate. However, due to the reactivity of the silicate ester bond, particularly in the presence of the hydrogen chloride which is released during the reaction, some condensation reaction takes place resulting in the commercial product known as "condensed" ethyl silicate. A typical analysis of "condensed" ethyl silicate is:

93 percent monomer $Si(OEt)_4$
6 percent dimer
0.6 percent trimer
Balance higher polymers Tetraethyl ortho silicate is produced by the distillation of "condensed" ethyl silicate. This is the chemically pure form of ethyl silicate - the ethyl silicate monomer - and contains 28.8 weight percent silica.

The third commercial form of ethyl silicate is ethyl silicate 40 which is a condensed product that contains about 40 weight percent silica. Ethyl silicate 40 is prepared by reacting silicon tetrachloride with wet ethanol, wherein about 0.8 mol of water is present for each mol of silicon tetrachloride. The water reacts with the $SiCl_4$ forming silanol groups which can then react with other $SiCl_4$ molecules to form siloxane linkages. The ethanol can then react to form the ethoxy groups with the silicon atoms. Ethyl silicate 40 is a light-colored liquid composed of mixed ethyl polysilicates with an average of about five silicon atoms per molecule. A typical average analysis of ethyl silicate 40 is:

13 percent monomer $Si(OEt)_4$
17 percent dimer $(EtO)_3SiOSi(OEt)_3$
14 percent trimers
20 percent tetramers and pentamers
Balance high cyclics and polymers Additional ethyl silicates are prehydrolyzed ethyl silicates, such as those described in U.S. Pat. No. 3,056,684 and modified ethyl silicates, such as those described in U.S. Pat. No. 3,392,036.

The ethyl silicates described hereinbefore are useful as the major vehicle component of this invention either alone or in admixture with each other. However, the preferred ethyl silicate is ethyl silicate 40, the commercially available form of ethyl silicate which contains about 40 weight percent silica.

Coating compositions based on ethyl silicates will cure when applied to a substrate and exposed to atmospheric moisture. Promoters, either acidic or basic in nature, have been used to increase the rate of hydrolysis and polycondensation of the silicate esters. In this invention monoethanolamine is used as the promoter. With the use of monoethanolamine, coating compositions are obtained which, within 3 to 5 minutes after being applied, dry to a handleable condition. Well cured coatings are obtained within 24 hours after the coatings are applied.

Although monoethanolamine is a preferred amine for catalyzing the cure of zinc-ethyl silicate, its use has a disadvantage in that mixtures of ethyl silicate, zinc and monoethanolamine, even in the absence of moisture, will gas, i.e., hydrogen gas is evolved. Such gassing in closed containers causes pressure buildups which can lead to ruptures of the containers and not only to loss of paint but to paint being sprayed over the area in the vicinity of the container. It has been found that the addition of zinc chromate to the zinc ethyl silicate, monoethanolamine compositions eliminates such gassing and enables the compositions to be stored in closed containers indefinitely. The zinc chromate utilized is finely divided in pigment form and is dispersed in the composition as a pigment. In addition to preventing gassing, it has been found that coatings prepared from zinc, ethyl silicate, monoethanolamine compositions which contain zinc chromate have corrosion resistance superior to such compositions which contain no zinc chromate.

The amount of monoethanolamine used in the compositions of this invention will vary from about 7.5 to 30 parts by weight per 100 parts by weight of ethyl silicate, with the preferred amounts being about 10 to 20 parts by weight. Zinc chromate is used in the amount of 7.5 to 50 parts by weight based on 100 parts by weight of ethyl silicate with the preferred amounts being 10 to 20 parts by weight.

Zinc pigments used in the coating compositions of this invention are in the "dust" form and should be relatively pure, i.e., about 95 percent pure, although mixtures of zinc dust and zinc oxide can be used, wherein up to about 25 weight percent of the zinc pigment is zinc oxide. Zinc pigments are fully described in "Organic Coatings Technology," Vol. II by H. F. Payne (1961), pp. 934–936 which is hereby incorporated by reference. The zinc pigment is used in the compositions of this invention in the amounts of about 3 to 10 parts by weight based on 1 part by weight of ethyl silicate and preferably about 4 to 7 parts by weight per 1 part by weight of ethyl silicate.

As described in U.S. Pat. No. 3,562,124, which is hereby incorporated by reference, refractory ferro alloys can be used to replace part of the zinc metal to enhance the weldability of the metals coated with the compositions of the invention with no detriment to corrosion resistance. Examples of such refractory ferro alloys include ferrophosphorous, ferromanganese, ferromolybdenum, ferrosilicon, ferrochrome, ferrovanadium, ferrozirconium, ferrotitanium, ferrotungsten, ferroboron, and the like. The preferred refractory ferro alloy is ferrophosphorous. Up to about 50 weight percent of the zinc pigment can be replaced with the refractory ferro alloy with the preferred amounts being about 15 to 30 weight percent. Various extender pigments, such as barytes, talc, clays, and the like can also be used in combination with the zinc pigment.

In order to facilitate handling and application properties, the compositions of this invention are generally reduced with volatile organic solvents well known in the art, particularly aliphatic and aromatic hydrocarbons, alcohols and glycol ethers. Examples include mineral spirits, naphthas, heptane, hexane, mixed petroleum fractions, toluene, xylene, isopropyl alcohol, butyl alcohol, ethylene glycol monoethyl ether, ethylene glycol monobutyl ether, diethylene glycol monoethyl ether, and the like. Enough solvent is added to the vehicle composition over the course of the mixing and grinding operations so that when completely prepared the vehicle portion will have a viscosity sufficiently low enough to allow mixing with the zinc pigment. Generally, the preferred viscosity is about 10 to 20 seconds on a No. 4 Ford cup. In most cases the amount of solvent in the final paint composition will be about 20 to about 40 weight percent based on the weight of the total paint.

Depending upon the particular end use and the desired color of the applied coatings, various modifiers can be added to the compositions of this invention. Examples include colored pigments, flow control agents, thixotropes, surfactants, minor amounts of organic resins and the like. In order to facilitate the application of these coating compositions by spray-gun and to improve the storage properties, antisettling agents can be added. Examples of such antisettling agents include: organic treated clays; amine treated magnesium montmorillonites (the Bentones, e.g., Bentone No. 27, National Lead Co.), described in U.S. Pat. No. 2,531,427; metallic fatty acid esters, e.g., aluminum or zinc stearate; high molecular weight acid salts; synthetic silicas; polymerized vegetable oils, e.g., treated castor oils and gelled linseed oils; acrylic ester homopolymers and copolymers with vinyl esters and vinyl aromatic monomers; and asbestos fibers. The amounts of such modifiers that can be used will vary depending upon the modifier itself and the particular form or end use of the compositions of this invention. Such amounts are well known to those skilled in the art and specific amounts can be readily ascertained through routine experimentation.

In order to obtain a one package system that can be stored for extended periods of time, the components used to prepare the compositions of this invention should be essentially free of water and care should be exercised during the manufacture of the composition to prevent moisture contamination. In order to offset the detrimental effects of trace amounts of water which might be introduced into these compositions either in the components or during processing, moixture scavengers can be added to the compositions. Particularly suitable moisture scavengers are molecular sieves which are made from natural or synthetic crystalline alkali-metal alumino-silicates of the zeolite type as described in U.S. Pat. Nos. 2,882,243 and 2,882,244. The amount of such molecular sieves which can be used in the compositions of this invention will vary from about 0.1 to about 1.0 weight percent based on the total weight of the compositions.

The compositions of this invention can be prepared by mixing, blending and/or milling the components which can be added in practically any order. For optimum weldability it is generally preferred to add the zinc dust pigment, which includes the refractory ferro alloys, after all the other components have been intimately mixed. The compositions of this invention are particularly adapted to be used as one package systems. However, in some cases it may be preferred to add the zinc pigment and/or the monoethanolamine to the remaining components just prior to use.

The compositions of this invention can be applied by any of the methods by which paints are generally applied. However, application by pressure spraying is preferred. The compositions of this invention are adapted for use in the protection of ferrous products subject to corrosive or moisture containing atmospheres. In particular, the coatings of this invention are useful in protecting gutters, ship hulls, pier pilings, bridge structures, industrial buildings exposed to corrosive atmospheres and the like. The compositions are particularly adaptable for use as preconstruction primers, since they afford corrosion protection at film thickness of less than 1 mil and provide surfaces which can be welded to form good strong welds.

In the following examples parts and percentages unless otherwise stated are parts by weight.

Example 1

To a Kady mill were added 27.37 parts of xylene, 0.46 part of ethylene glycol monoethyl ether and 0.22 part anionic wetting agent. The mill was started and 0.46 part Bentone No. 27 (amine treated magnesium montmorillonite) was added. 1.36 parts of a granular vinyl toluene/acrylate copolymer, having a melting point of 54°C., were then added and milling was continued until the copolymer had dissolved and the temperature had reached 110°F. 9.95 parts of ethyl silicate 40, 0.65 part of Molecular Sieve, Type 3A, obtained from Union Carbide Corporation (a crystalline metal alumino-silicate having an equilibrium water capacity of about 23 percent by weight) and 1.59 parts of finely divided zinc chromate were added. Mixing and milling were continued for 2 minutes and 1.25 parts of monoethanolamine were slowly added. After 2 minutes additional milling, 1.14 parts of asbestos fibers were added with the temperature during these additions slowly rising to 130°F. After thoroughly mixing all of the components, the paint vehicle was drained from the mill and the mill was rinsed with 1 part of xylene. In a Hockmeyer mixer the vehicle was mixed with 13.64 parts of ferrophosphorus alloy ($Fe_2P$) and 40.91 parts of zinc dust. The resulting paint had a viscosity of 76 K.U. and a weight per gallon of 15.3 lbs. The paint was stored in closed containers. After standing overnight, no settling or gassing was noted.

Sand blasted steel panels were sprayed with the paint to a wet thickness of 2 to 2.5 mils, a dry thickness of 0.5 to 1.0 mil. The coated panels were dry to the touch within 3–5 minutes and were hard and cured overnight at room temperature. The cured coatings exhibited excellent adhesion and showed no corrosion after 75 days in a salt spray cabinet, per ASTM Method B-117 using a 5 percent aqueous sodium chloride solution.

No gassing was noted in the closed containers after 8 months at room temerperature.

Example 2

To a Kady mill were added 8.18 parts of toluene, 11.78 parts of xylene and 4.55 parts of a high speed dispersion blend of 10 parts of ethylene glycol monoethyl ether, 75 parts of xylene, 5 parts of anionic wetting agent and 10 parts of Bentone No. 27. After mixing, 1.36 parts of a granular vinyl toluene/acrylate copolymer, having a melting point of 54°C., were added and mixing was continued until the copolymer was dissolved, 9.95 parts of ethyl silicate 40, 0.65 part of Molecular Sieve, Type 3A and 1.59 parts of zinc chromate were added. After mixing for 2 minutes, 1.25 parts of monoethanolamine were added. After an additional 2 minutes mixing, 1.14 parts of asbestos fibers were added. Milling was continued for 30 minutes until a temperature of 130°F. was reached. The mill contents were drained into a change tank and the mill was rinsed with 5.0 parts of xylene. In a Hockmeyer mixer, the paint vehicle including the rinse solvent was mixed with 13.64 parts of ferrophosphorous alloy and 40.91 parts of zinc dust. The paint was then stored in closed containers. After standing overnight no settling or gassing was noted.

Sand blasted steel panels were sprayed with the paint to a wet thickness of 2 to 2.5 mils, a dry thickness of 0.5 to 1.0 mil. The coated panels were dry to the touch within 3–5 minutes and were hard and cured overnight at room temperature. The cured coatings showed excellent adhesion to the steel panels, and the panels exhibited no corrosion after 80 days of exposure to salt spray.

Example 3

To a Kady mill were added 5.62 parts of toluene, 7.50 parts of xylene, 5.0 parts of ethyl silicate 40 and 4.17 parts of a high speed dispersion of 10 parts ethylene glycol monoethyl ether, 75 parts xylene, 5 parts anionic wetting agent and 10 parts of Bentone No. 27. Under agitation 1.25 parts of a granular vinyl toluene/acrylate copolymer, having a melting point of 54°C. were added and mixing was continued until the copolymer had dissolved. 3.33 parts of ethyl silicate 40 and 2.30 parts of a prehydrolyzed boron modified tetraethyl silicate having a silica content of 17–19 wt. percent and a boron content of 0.13–0.16 wt. percent (described in U.S. Pat. No. 3,392,036) were added followed by the addition of 0.60 part of Molecular Sieve, Type 3A, 1.67 parts of zinc chromate and 2.94 parts of isopropyl alcohol. After mixing for 2 minutes 1.25 parts of monoethanolamine and 1.04 parts of asbestos fibers were added. After milling for an additional 25 minutes and with the temperature at 125°F., the mill was drained and rinsed with 5.0 parts of xylene. In a Hockmeyer mixer the paint vehicle was mixed with 19.58 parts of ferrophosphorus alloy and 43.75 parts of zinc dust. The resulting paint had a viscosity of 76 K.U. and a weight per gallon of 16.1 lbs. After standing overnight in a closed container, no settling or gassing was noted.

Sand blasted steel panels were sprayed with the paint to a wet coating thickness of 2 2.5 mils, 0.5 1.0 mil dry. The coatings were dry to the touch within 3–5 minutes and were hard and well cured overnight. The cured coatings exhibited excellent adhesion to the steel panels and excellent salt spray corrosion resistance after 75 days. No gassing was noted after 11 months at room temperture.

Example 4

To a Kady mill were added 8.18 parts of toluene, 11.78 parts of xylene and 4.55 parts of a high speed dispersion blend of 10 parts of ethylene glycol monoethyl ether, 75 parts of xylene, 5 parts of anionic wetting agent and 10 parts of Bentone No. 27. After mixing, 1.36 parts of a granular vinyl toluene/-acrylate copolymer, having a melting point of 54°C., were added and mixing was continued until the copolymer was dissolved, 9.95 parts of ethyl silicate 40, 0.65 part of Molecular Sieve, Type 3A and 1.59 parts of zinc chromate were added. After mixing for 2 minutes, 1.25 parts of monoethanolamine were added. After an additional 2 minutes mixing, 1.14 parts of asbestos fibers were added. Milling was continued for 30 minutes until a temperature of 130°F. was reached. The mill contents were drained into a change tank and the mill was rinsed with 5.0 parts of xylene. In a Hockmeyer mixer, the paint vehicle including the rinse solvent was mixed with 54./55 parts of zinc dust. The paint was then stored in closed containers. After standing overnight no settling or gassing was noted.

Sand blasted steel panels were sprayed with the paint to a wet thickness of 2 to 2.5 mils, a dry thickness of 6.5 to 1.0 mil. The coated panels were dry to the touch within 3-5 minutes and were hard and cured overnight at room temperature. The cured costings showed excellent adhesion to the steel panels, and the panels exhibited no corrosion after 80 days of exposure to salt spray.

It is understood that the foregoing detailed description is given merely by way of illustration and that many variations can be made therein without departing from the spirit of this invention.

What is claimed is:

1. In a one package zinc rich coating composition comprising ethyl silicate, zinc and monoethanolamine, the improvement which comprises the addition of zinc chromate in the amount of about 7.5 to 50 parts by weight based on 100 parts by weight of ethyl silicate.

2. The composition of claim 1 wherein the amount of zinc chromate is about 10 to 20 parts by weight based on 100 parts by weight of ethyl silicate.

3. The composition of claim 1 wherein the ethyl silicate is ethyl silicate which contains 40 weight percent silica.

4. A one package zinc rich coating composition comprising zinc, ethyl silicate, monoethanolamine and zinc chromate wherein about 7.5 to 30 parts by weight of monoethanolamine and about 7.5 to 50 parts by weight of zinc chromate are present per 100 parts by weight of ethyl silicate and wherein about 3 to 10 parts by weight of zinc are present for each part by weight of ethyl silicate.

5. The composition of claim 4 wherein the amount of monoethanolamine is about 10 to 20 parts by weight per 100 parts of ethyl silicate, the amount of zinc chromate is about 10 to 20 parts by weight per 100 parts of ethyl silicate and the amount of zinc is 4 to 7 parts by weight for each part by weight of ethyl silicate.

6. The composition of claim 4 wherein the ethyl is ethyl silicate which contains about 40 weight percent silica.

7. The composition of claim 4 wherein up to 50 weight percent of the zinc is replaced with a refractory ferro alloy.

8. The composition of claim 7 wherein the refractory ferro alloy is ferrophosphorous.

9. The composition of claim 8 wherein the amount of ferrophosphorous is about 15 to 30 weight percent.

* * * * *